Feb. 24, 1942. W. S. HOOVER Re. 22,034

VARIABLE PITCH PROPELLER MECHANISM

Original Filed Nov. 27, 1934 8 Sheets-Sheet 1

Inventor:
Walter S. Hoover

William B. Jaspert
Attorney.

Feb. 24, 1942. W. S. HOOVER Re. 22,034

VARIABLE PITCH PROPELLER MECHANISM

Original Filed Nov. 27, 1934 8 Sheets-Sheet 2

Inventor.
Walter S. Hoover,

William B. Jaspert
Attorney.

Feb. 24, 1942. W. S. HOOVER Re. 22,034

VARIABLE PITCH PROPELLER MECHANISM

Original Filed Nov. 27, 1934 8 Sheets-Sheet 3

Inventor:
Walter S. Hoover.

William B. Jaquet
Attorney.

Feb. 24, 1942. W. S. HOOVER Re. 22,034

VARIABLE PITCH PROPELLER MECHANISM

Original Filed Nov. 27, 1934 8 Sheets-Sheet 4

Inventor,
Walter S. Hoover.

William B. Jaspert
Attorney.

VARIABLE PITCH PROPELLER MECHANISM

Original Filed Nov. 27, 1934 8 Sheets-Sheet 5

Inventor,
Walter S. Hoover.

William B. Jaspert
Attorney.

VARIABLE PITCH PROPELLER MECHANISM

Original Filed Nov. 27, 1934 8 Sheets-Sheet 6

Inventor,
Walter S. Hoover.

William B. Jaspert
Attorney.

Feb. 24, 1942. W. S. HOOVER Re. 22,034

VARIABLE PITCH PROPELLER MECHANISM

Original Filed Nov. 27, 1934 8 Sheets-Sheet 7

Inventor,
Walter S. Hoover.

William B. Jaspert
Attorney.

Feb. 24, 1942. W. S. HOOVER Re. 22,034

VARIABLE PITCH PROPELLER MECHANISM

Original Filed Nov. 27, 1934 8 Sheets-Sheet 8

Inventor,
Walter S. Hoover.

William B. Jaspert
Attorney.

Reissued Feb. 24, 1942

Re. 22,034

UNITED STATES PATENT OFFICE 22,034

VARIABLE PITCH PROPELLER MECHANISM

Walter S. Hoover, West Hartford, Conn.

Original No. 2,184,143, dated December 19, 1939, Serial No. 755,031, November 27, 1934. Renewed September 15, 1936. Application for reissue July 27, 1940, Serial No. 348,011

13 Claims. (Cl. 170—163)

Figure 1:
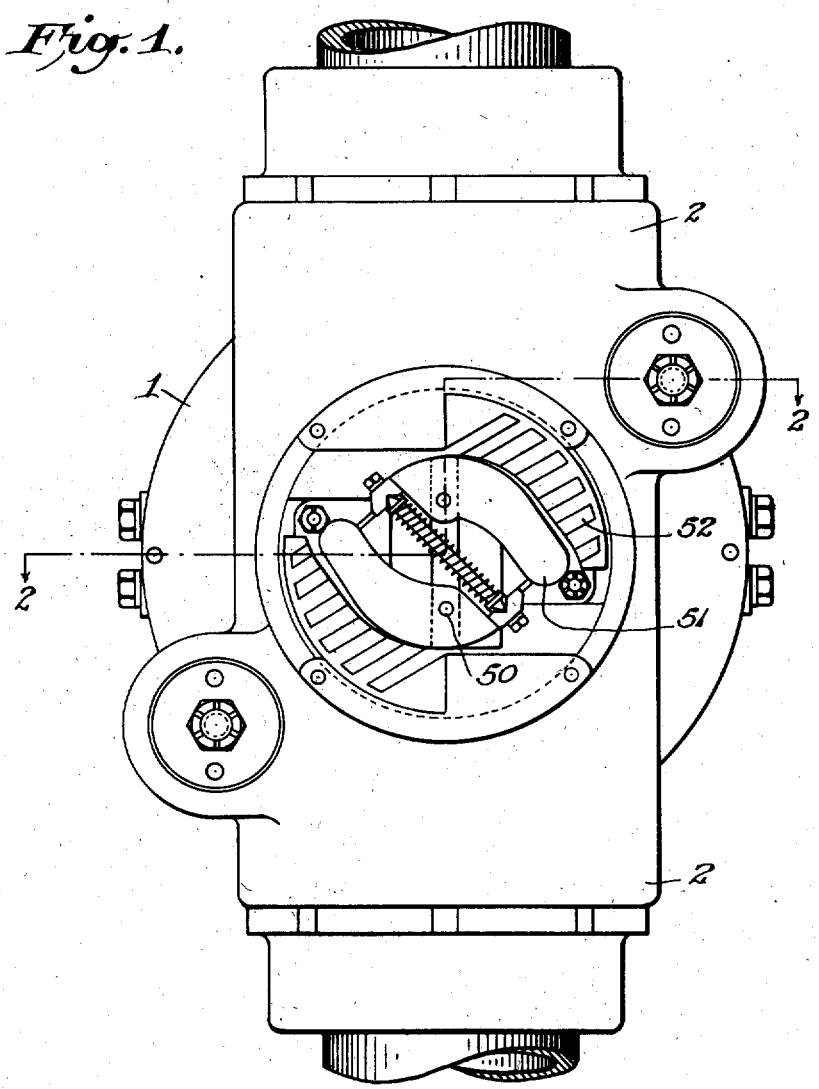

This invention relates to improvements in variable pitch propeller mechanism, of the general type disclosed in my Patent 1,972,486, issued September 4, 1934.

In the aforementioned patent there is disclosed an hydraulic mechanism for manually and/or automatically effecting the pitch setting of the propeller blades in accordance with the motor load conditions incident to the maneuverability of air-craft.

In accordance with the present invention, novel means are provided for transmitting the force developed by the hydraulic unit to the propeller blades in a manner to prevent hunting of the motor which is characteristic of the automatically controlled variable pitch propeller mechanisms heretofore proposed.

In accordance with the present invention, the medium through which the hydraulic force is transmitted is self-locking and yet eliminates friction loss, thus rendering it highly efficient and in addition provides a high reduction ratio between the source of power and the blades.

It is another object of the invention to provide mechanism which shall be adapted to effect a change in the setting of the propeller pitch angle in a smooth and steady manner thereby preventing abrupt changes in motor operation and consequent severe stress on the operating parts.

Still another object of the invention is the provision of semi-automatic means for manually controlling the adjustment for pitch setting through the medium of electrical control of the hydraulic unit which, when released, restores automatic control.

Still a further object of the invention is the provision of manual control means for the hydraulic operating mechanism which may be readily substituted for the fully automatic or semi-automatic control mechanism.

Figure 2:
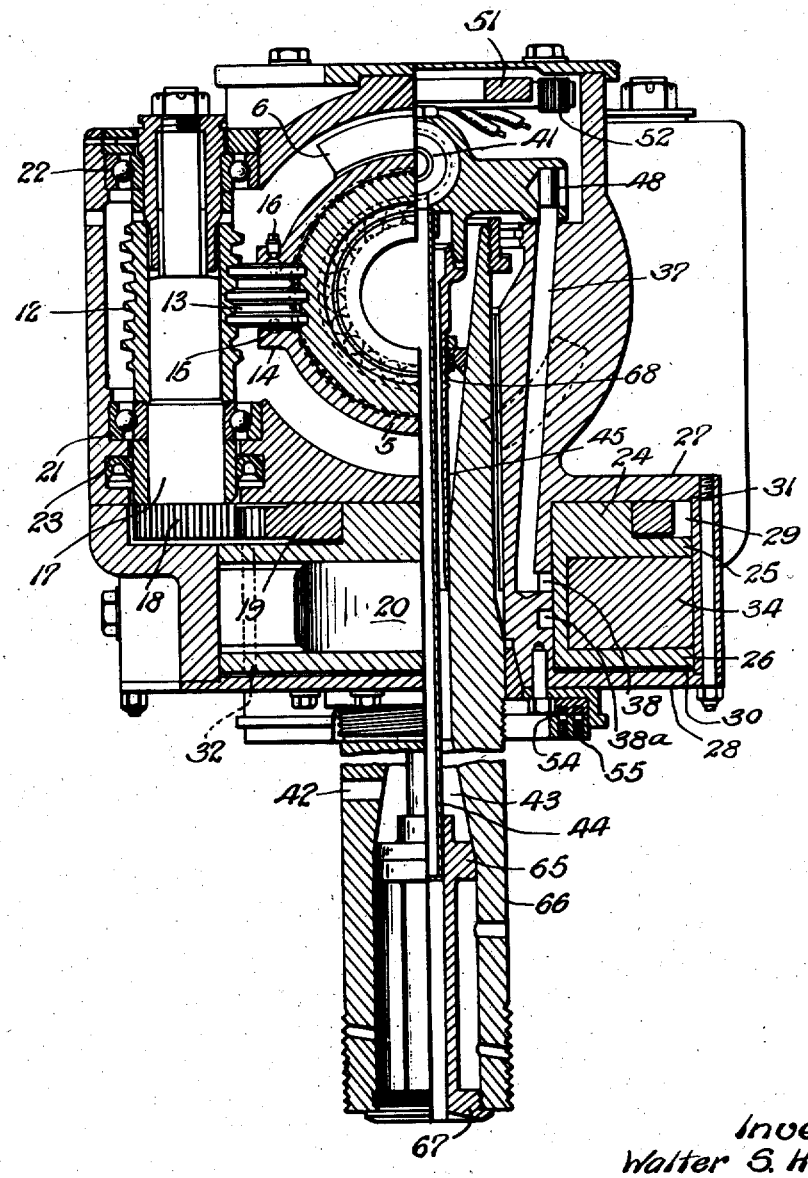
Figure 3:
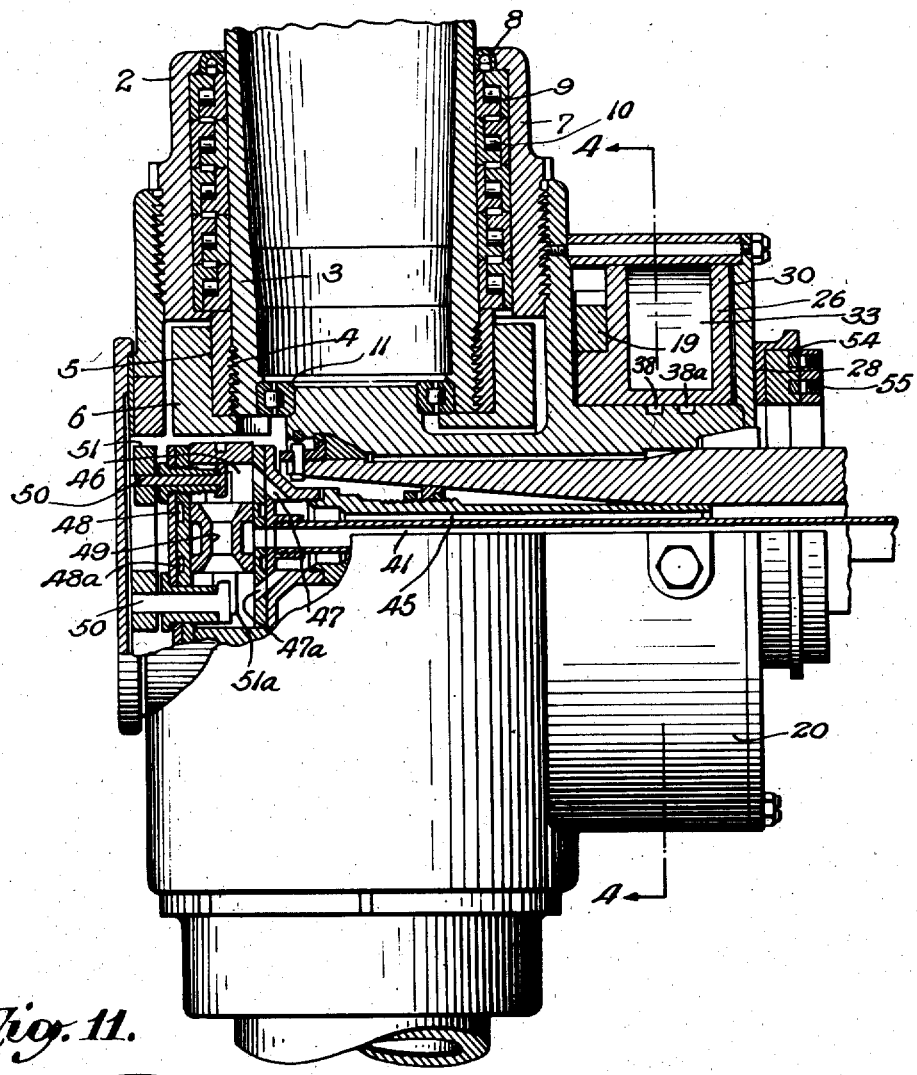
Figure 11:
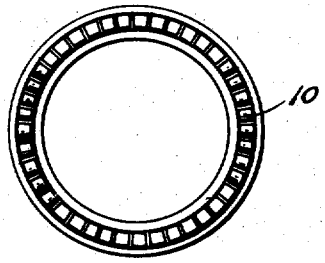
Figure 4:
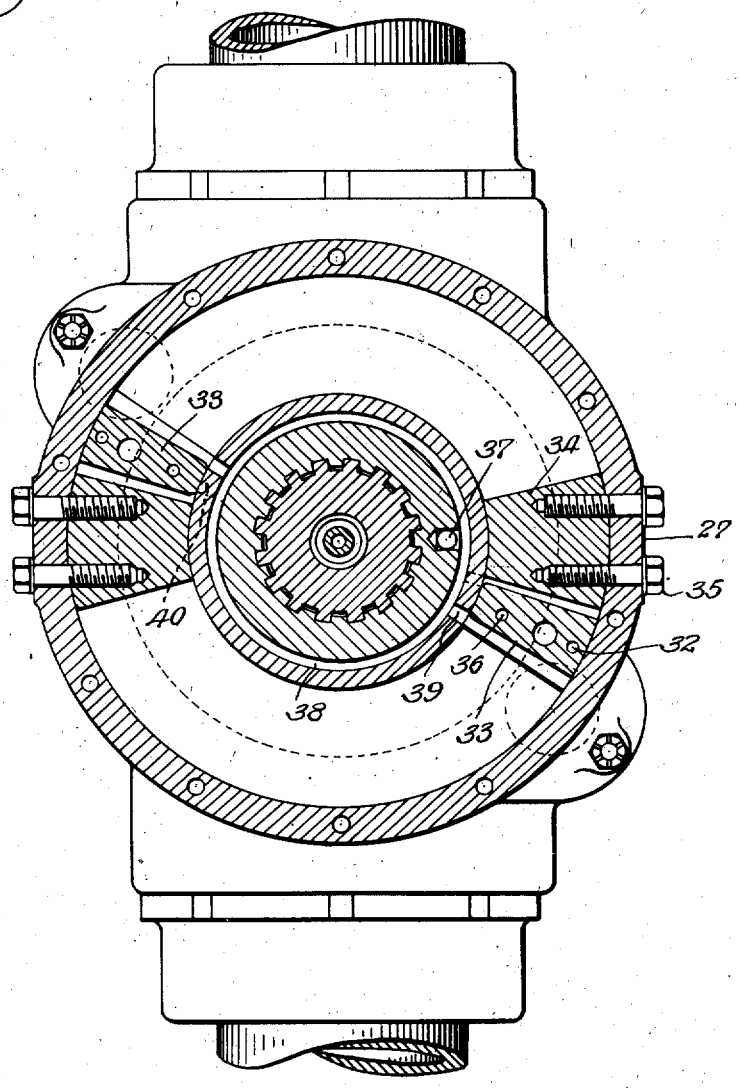
Figure 5:
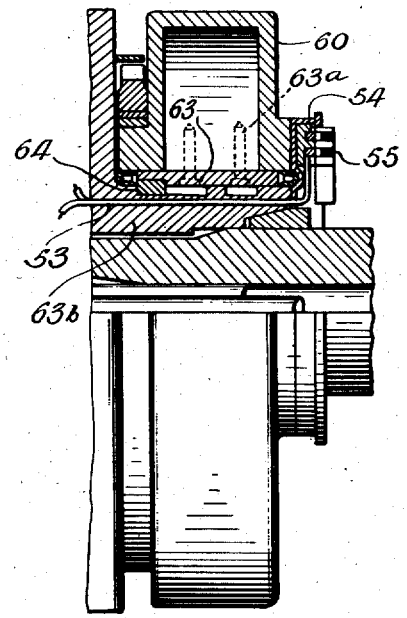
Figure 6:
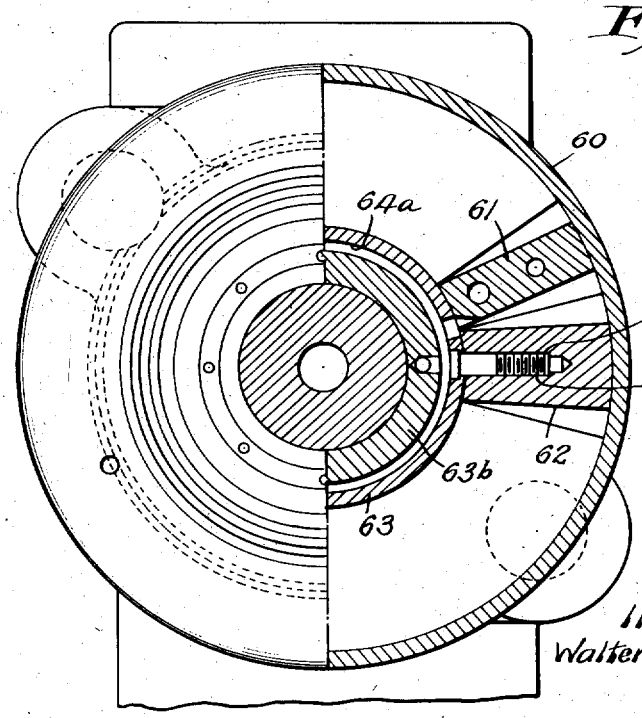
Figure 7:
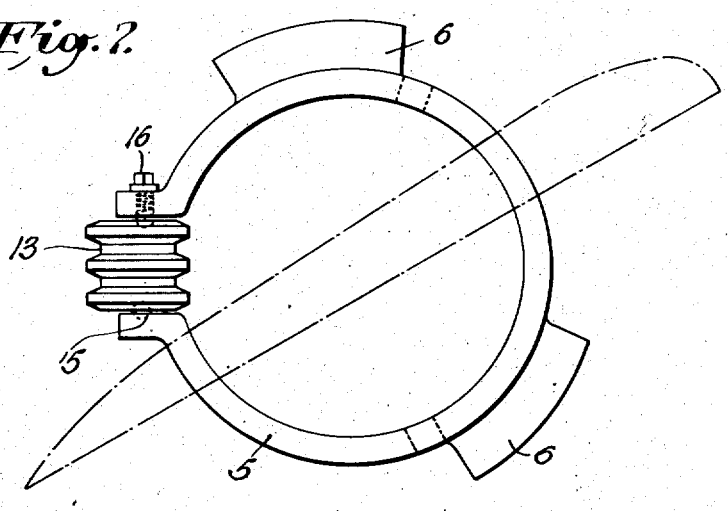
Figure 8:
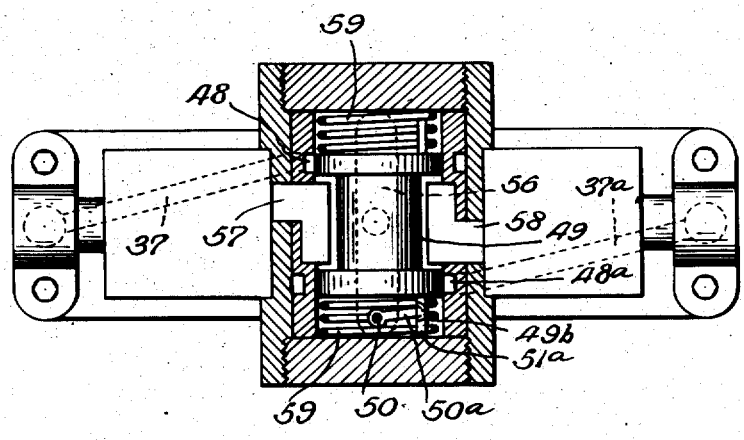
Figure 10:
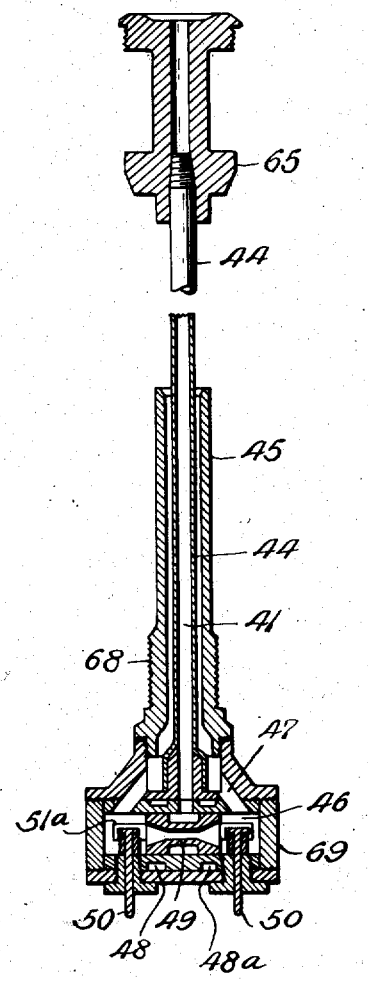
Figure 9:
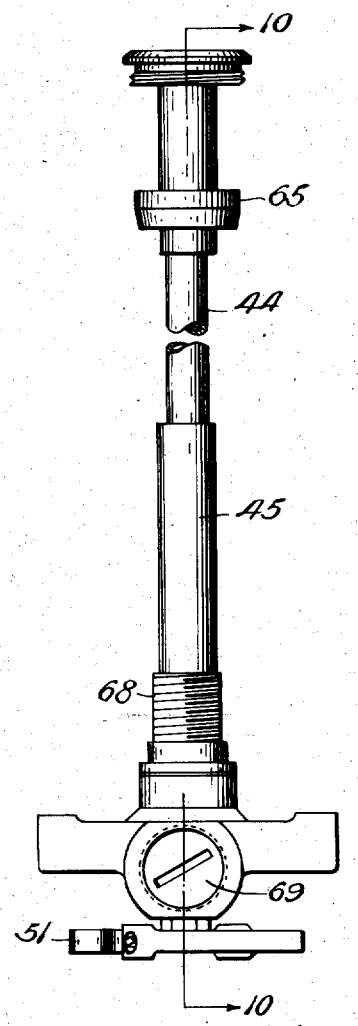
Figure 12:
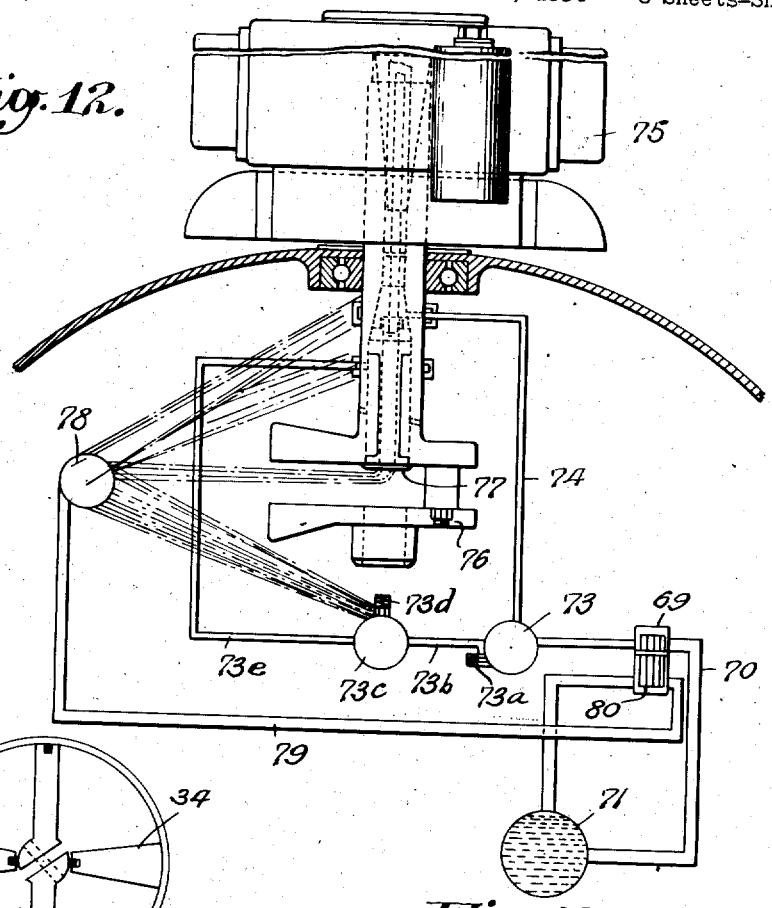
Figure 13:
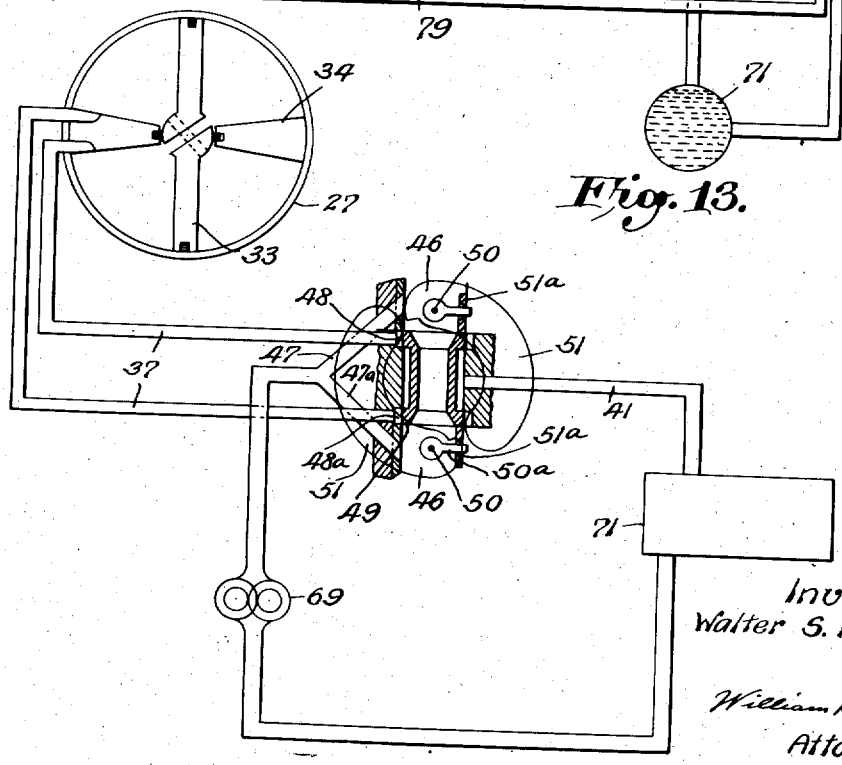

These and other objects of the invention will become more apparent from a consideration of the accompanying drawings constituting a part hereof in which like reference characters designate like parts and in which:

Fig. 1 is a front elevational view of a variable pitch propeller unit embodying the principles of this invention, having its front cover removed;

Fig. 2 a cross-sectional view thereof taken along the line 2—2, Fig. 1;

Fig. 3 a side elevational view partially in section of the structure shown in Figs. 1 and 2;

Fig. 4 a sectional elevational view taken on the line 4—4, Fig. 3;

Fig. 5 a side elevation partially in section of a portion of the propeller hub unit illustrating a modified form of hydraulic rotor;

Fig. 6 a rear view with the housing shown in Fig. 5 partly cut away;

Fig. 7 a plan view of the blade operating annulus diagrammatically illustrating the mounting of the internal counterweights on the blades;

Fig. 8 a cross-sectional view partially in elevation of an electro-magnetically actuated control valve;

Fig. 9 a plan view of the pressure and relief tubes with control valve and governor arms;

Fig. 10 a cross-section of the tube of Fig. 9 taken on line 10—10, Fig. 9;

Fig. 11 a plan view of the roller bearing for the blade anchorage shown in Fig. 3;

Fig. 12 a diagrammatic showing of the oil pressure system and its connection to the engine and pitch adjusting unit; and Fig. 13 a diagrammatic view illustrating the routing of the pressure fluid through the control valve to the hydraulic actuating unit.

With reference to Figs. 1 to 4 inclusive of the drawings, the numeral 1 generally designates a propeller hub casting or forging having oppositely disposed hollow extensions 2 for mounting the propeller blade anchorages. While for the purpose of illustration a hub design for two blades is shown, it is obvious that the invention is applicable to propeller mountings employing any number of adjustable blades.

In Fig. 3 the blade root 3 is shown provided with a buttress thread 4 to receive an annulus 5 on which is mounted oppositely disposed counterweights 6, the counterweights being at right angles to the face of the blades as is diagrammatically shown in Fig. 7 of the drawings. The function of the counterweights 6 is to partly counter-balance the magnitudes of centrifugal torsion moments which act on the geometrical mass of the blade to assume lines of exact radii from the nearest centerline tending to flatten-out the pitch in the plane of rotation. For example, in a propeller operating at 2,100 R. P. M. with the centrifugal torsion at about 4,000 inch pounds for each blade, the employment of internal counterweights 6, while ineffective to entirely balance-out the centrifugal torsion because of space limitations, will reduce the magnitude of centrifugal torsion moments about 1,500 inch pounds for each blade. The weights are positioned at approximately 45° from the crank shaft centerline when the blades are adjusted for normal operation.

A sleeve 7, Fig. 3, having a flange 8 houses a series of roller bearings 9 and 10, the bearings 9 having their axes parallel to the axis of the blade to take up the angular thrust of the blade, and the remaining bearings 10 are radially disposed to take up the centrifugal thrust of the blade. Roller bearings 11 are provided at the extreme lower end of the blade root with their axes in parallel alinement with the bearings 9 to take up the angular thrust and to provide a maximum spacing of the thrust bearings to provide strength and rigidity in variable propeller blade mounting. The bearings 11 by their manner of assembly are preloaded to take up internal slackness of the bearing set up. The bearings 10 are interchangeable and are necessarily designed to effect uniform distribution of the load on all of the thrust members, the roller races requiring precision in their tolerances. The short leg of the L-shaped races is adapted to flex slightly under load to make up any discrepancies in the tolerances of successive bearings, thus equalizing the load over a series of stack bearings.

The propeller blade anchorages as above described are actuated to vary the pitch setting by subjecting the annulus 5 in which they are mounted to angular movement, this being accomplished by a worm 12, Fig. 2, having tooth engagement with a roller 13 that is mounted in an off-set portion 14 of the member 5. The teeth of the roller 13 are annular and the worm 12 is of the Hindley type, the face of the worm being slightly concave to conform to the arc on which the tooth extremity of the roller 13 travels. Roller 13 is anti-frictionally mounted by balls 15, one of which fits into a hemispherical seat in the projecting portion 14, and the other ball is held in place by an adjustable cavity in a screw 16.

The worm 12 is mounted on a shaft 17 having a pinion 18 that interacts with the teeth of a ring gear 19 which is actuated by a fluid motor generally designated by the numeral 20.

The worm shaft 17 is anti-frictionally mounted by bearings 21 and 22, and a U-shape packing 23 prevents leakage of fluid from the hydraulic unit 20 through the gear teeth.

The hydraulic unit 20 comprises a rotor 24 having flanges 25 and 26 which in cooperation with housing walls 27 and 28 form leak pressure cavities 29 and 30, the flange walls 25 and 26 being of rigid mechanical construction to prevent distortion and to permit of proper sealing of the housing and rotor by gaskets 21. The leak pressure cavities 29 and 30 are adapted to counteract the internal pressure of the rotor by building up pressure due to the slippage of fluid by the pressure differential between the inner and outer faces of the flanged wall. The pressure on both sides of the flanged walls 25 and 26 is substantially balanced by the leak pressure balancing leaks 32 extending through movable vanes 33 and through flange walls 25 and 26, this lead being shown in dotted lines in Fig. 2 and is more clearly shown in Fig. 4 of the drawings.

With reference to Fig. 4, the hydraulic unit embodies a pair of stationary abutments 34 which are secured to the housing 27 by cap bolts 35 or in any other suitable manner, these stationary abutments cooperating with the movable vanes 33 that are attached by dowel pins 36 to the flange walls 25 and 26 of the rotor, the vanes 33 cooperating with the fixed abutments to be relatively movable by fluid presure which is supplied through a pressure lead 37 communicating with an annular lead 38 having ported openings 39. The pressure is released through a duplicate annular lead 38a communicating with the ported opening 40, the annular leads being more clearly shown in Fig. 2.

The flow of fluid is controlled through valve mechanism generally designated by the numeral 41 which regulates the flow from a port 42 in the side of the propeller hub shaft, Fig. 2, to a flow cavity 43 which surrounds a relief pipe 44 by which the fluid is returned to the pressure source. The flow cavity 43 communicates with a tube 45 that extends to a valve chamber 46, Fig. 3, from which it flows through a ported passage 48 to the pressure lead 37 of the rotor, Figs. 2 and 4.

Ported passages 48 and 48a are controlled by a slide valve 49, Figs. 3, 8 and 10, the valve being of spool shape and hollow in the center to balance the pressure on its outer flange. Valve 49 is actuated by a governor to control the flow of pressure to one side of the vanes 33 and simultaneously relieve the pressure on the opposite side. The governor comprises shafts 50 having governor arms 51, Figs. 1 and 3, which are responsive to centrifugal force produced by rotation of the hub to actuate their respective shafts 50 which bring about the movement of the slide or spool valve 49 through connecting levers 50a, Figs. 3, 8 and 10. It will be apparent from Fig. 3 that when valve 49 is moved in the direction where it uncovers the port 48 on the outside of its end flange, it will simultaneously uncover the other port 48a on the inside of the opposite flange (Fig. 3) thus relieving the pressure on one side of vane 33 through the passage 41 of the inner tube or pipe 44.

Valve 49 is controllable manually for synchronizing the pitch setting of a plurality of propeller units by actuating governor arms 51 independently of the centrifugal force that tends to spread them, such control being effected through a pair of electrical solenoids 52, Fig. 1, and solenoids 57 and 58, Fig 8, that are electrically connected through lead wires 53 with collector rings 54 mounted on the rear of the hydraulic rotor, current being supplied to the collector ring through brushes 55 connected to a source of electrical energy such as a battery. The control is effected by means of a push button switch (not shown) which, when held depressed by the operator, will energize solenoids 52 thereby drawing out the governor arms 51 to produce the desirable adjustment of the valve 49 that causes actuation of the movable vanes of the hydraulic unit to produce a desirable pitch setting. When the button switch is released, solenoids 52 will be deenergized and governor arms 51 will assume the position they would have for the particular revolutions of the propeller shaft at the time of such release.

The mechanism may also be entirely manually controlled by means of the structure shown in Fig. 8 wherein the governor arms 51 are removed from their shafts 50 and a movable armature 56 is mounted on one of said shafts. The armature is actuated by solenoids 57 and 58 which are wired to collector rings 54, Fig. 3, and controlled by separate switches. The valve 49 shown in Fig. 8 is biased by coil springs 59 to a normal position of pitch setting. Valve 49 is provided with an axially extending finger 51a having a notch 49b which is engaged by a lever 50a mounted to be movable with shaft 50 in response to angular movement of the armature 56. It will be noted as viewed in Fig. 8 of the drawings that the valve 49 has flanged ends which control the ported ducts 48 and 48a for directing the fluid pressure to the hydraulic actuator for effecting a forward or reverse pitch setting, the dimensions of the valve flanges and ports being such that it requires but a very slight movement of the valve to establish communication of the ducts 48 and 48a with the source of fluid in the valve chamber between the flanged ends of the valve 49. By energizing one of the solenoids with one of the switches the valve 49 will route the actuating fluid to set the pitch of the blades to forward position, and by energizing the other of the solenoids the fluid will be routed to reverse the pitch setting of the blade thus affording an all-manual control without any change of the blade actuating mechanism.

A modified form of hydraulic unit or motor is shown in Figs 5 and 6 of the drawings, and consists of a movable housing member 60 which carries the movable vanes 61 that cooperate with stationary abutments 62 secured to a sleeve 63 by bolts 63a. Sleeve 63 is keyed to a stationary hub portion 63 by a key 64, Fig. 5. The numeral 64a designates an annular pressure lead having ported openings therein. The operation of this type in which the outer housing is movable instead of the inner part as in Fig. 4, is the same as that of the operation of the structure of Fig. 4, the fluid pressure and relief passages being the same as is readily apparent from comparison of the two figures, the primary aim of the cylinder housing being to prevent distortion due to the oil pressures used.

Fig. 9 shows in detail the relief tube 44 and the pressure tube 45, one end of the relief tube 44 being provided with a plug 65 that fits in the counterbored portion of the propeller hub shaft 66, a screw plug 67 interacting with threads provided in the end of shaft 66 to hold the supply tubes 44 and 45 in position.

The pressure tube 45 has a threaded portion 68 that cooperates with U-shaped leather packing for longitudinal adjustment with the tapered face of crank shaft 66 with which it seals, and a screw plug 69 is provided to render valve 49 accessible. Governor arms 51 are shown attached to the end of the tube-like structure and are operatively connected to valve 49 to adjust the latter in response to variation in the motor speeds.

Fig. 12 diagrammatically illustrates a system for the development of oil pressure in a conventional motor by the use of auxiliary equipment which functions to develop pressure in excess of the engine pressures while maintaining lower pressure on the oil used for lubricating the engine parts. In Fig. 12 the numeral 69 designates a gear pump having a conduit 70 leading to a main tank 71 and a conduit 72 that delivers fluid under pressure to chamber 73 from which it is distributed at high pressure through conduit 74 to the hydraulic propeller unit generally designated by the numeral 75 Pump 69 delivers the oil to chamber 73 at a pressure in excess of the maximum pressure required for actuating the hydraulic propeller unit, and chamber 73 is provided with a relief valve 73a having adjustable means for setting the valve to maintain a predetermined oil pressure in chamber 73 as, for example, 200 pounds, so that the pressure delivered through conduits 74 to the hydraulic pitch setting unit will always be at 200 pounds, or whatever pressure is desired. The balance of the fluid delivered by pump 69 passes from chamber 73 through conduit 73b to a chamber 73c which is provided with a relief or blow-off valve 73d to maintain a predetermined pressure, such as 75 pounds, in the tank 73c. The lubricating fluid is delivered to the engine by conduit 73e from chamber 73c and the fluid, after passing through the parts of the engine to be lubricated, is returned to the engine sump 78, the blow-off and leak from chamber 73c and the engine being shown by dot-and-dash lines. The drain or return flow from the hydraulic propeller unit is shown as passing out the off-set of the crank shaft at the portion designated by the numeral 77. The oil from the engine sump is returned to the scavenging side 80 of pump 69 which returns it to the main tank 71.

The operation of the above described variable pitch propeller mechanism is briefly as follows: Assuming the blade roots to be mounted for rotary movement as hereinabove described, that is, in the bearing set up shown in Fig. 3 with the counterweighted annuli 5 in cooperative engagement with the worms 12 through rollers 13, the pitch of the propeller blades in the absence of manual control will be entirely determined by the operation of the governor arms 51 which respond to the centrifugal force produced by the speeds of the motor. As the governor arms 51 move angularly on their shafts 50, the valve 49 controlling the flow of fluid under pressure to the rotary abutments of the hydraulic unit will be actuated by levers 50a, Fig. 13, to open and close the ported passages 48 and 48a, respectively, thereby routing the pressure fluid from passages 47 and 47a through port 48 to the pressure lead 37 of the rotor thereby subjecting the movable vanes or abutments of the hydraulic unit to pressure on one side and relieving the pressure on the opposite side through port 48a to the sump passage 41, causing the rotor portion 33 to rotate which, through ring gear 19, actuates pinion 18 and connected worm shaft 12 causing the annuli 5 to move angularly to effect the change in pitch setting.

As previously stated, the worm drive is a self-locking device which prevents hunting of the motor due to leakage of pressure or slippage of the mechanical linkage, and yet through the roller engagement of the worm with the annuli substantially all friction is eliminated. Further, by means of the worm drive, a high reduction ratio between the fan blade and hydraulic rotor is attainable so that excessive fluid pressures are not required to operate the pitch setting mechanisms.

In the modification of hydraulic unit shown in Figs. 5 and 6, the same principle of operation is present, the only difference in the construction being the rotary movement of the housing instead of the inner member. If it is desirable to use the manual control as in starting, the operator energizes the circuit of solenoids 52 which actuate the governor arms 51 to effect a change of setting of valve 49 and a consequent movement of the rotary abutments to change the pitch angle.

When the manual control switch is released, the solenoids 52 will be deenergized and governor arms 51 will be released to the position which they would normally assume for the particular engine speed at such time.

If the all-manual control is employed as in the construction shown in Fig. 8, the governor arms 51 are dispensed with and solenoids are provided to actuate valve 49 for controlling the application of pressure to the face of the movable vanes. One of the solenoids will move the valve actuating armature 56 to forward position of pitch setting and the other to reverse pitch setting, and when both electrical circuits are deenergized, the valve will assume the position in which the blades will be disposed for a given operating condition. In the exercise of the manual control the solenoid circuits will remain energized only so long as the operator makes contact with push button or other control switch.

It is apparent from the foregoing description of this invention that variable pitch propeller mechanism operating on the hydraulic principle and embodying the principles herein disclosed provide efficient means for propeller blade adjustment within a compact space with mechanical devices that are compact and not of excessive weight.

By mounting the hydraulic unit or rotor at the rear of the hub more compactness and a shorter design is obtainable.

Although one embodiment of the invention has been herein illustrated and described, it will be obvious to those skilled in the art that various modifications may be made in the details of construction and in the arrangement of the cooperating parts without departing from the principles herein set forth.

I claim:

1. A hydraulic unit controlling the pitch setting of variable pitch propeller blades comprising a hub structure, blade anchorages mounted therein, a double acting vane type hydraulic actuator operatively connected to the blade anchorages to render them simultaneously movable, said actuator communicating with a source of fluid pressure, valve means controlling the application of fluid pressure to said actuator, said means being normally biased to maintain the valve in one position of its operation, electro-magnetic means for moving said valve means in the other positions of its operation, said valve and electromagnetic means being carried by said hub structure and means for energizing said electromagnetic means to render said valve means operative to increase or decrease the pitch setting of the propeller blades comprising, electrical contacts movable with said hub and electrically connected to said electromagnetic means, and means for supplying a source of electrical energy to said movable contacts.

2. A variable pitch propeller mechanism comprising a hub structure, blade anchorages mounted for rotary movement therein, screw shafts having gear tooth engagement with said anchorages, fluid pressure mechanism for simultaneously actuating the screw shafts and control means for said fluid pressure mechanism mounted in said hub and rotatable therewith to adjust the pitch setting of the blade anchorages in response to the speed of the hub, said fluid pressure mechanism comprising a housing having a plurality of stationary abutments, and a rotor having movable abutments, said rotor being geared to the screw shafts and said control means consisting of a speed responsive device and a slide valve connected to a source of fluid pressure and to the space between the stationary and movable abutments, said slide valve being actuated by the speed responsive device to actuate the rotor in accordance with desired changes in the pitch setting of the blade anchorage members.

3. A hydraulic unit for changing the pitch setting of variable pitch propeller blades comprising a hub structure, a plurality of blade anchorage members rotatably mounted therein, a double acting vane type hydraulic actuator geared to the blade anchorages to render them simultaneously movable, a conduit for supplying fluid pressure to said hydraulic actuator from a source remote from said propeller, valve means for controlling the application of fluid pressure to said actuator, means for operating the control valve comprising a movable armature normally biased to maintain the valve in one position of its operation, electromagnetic actuating means for said armature, said valve, armature and electromagnetic means being carried by said hub structure, and means for selectively energizing said electromagnetic means to increase or decrease the pitch setting of the blades comprising, electrical contacts movable with said hub and electrically connected to said electromagnetic means, and means for supplying a source of electrical energy to said movable contacts.

4. A variable pitch propeller mechanism comprising a hub structure and blades movably mounted therein, a double-acting vaned type of fluid motor, mounted on the propeller hub, connected with the blades for changing the pitch of the blades, a conduit for supplying fluid under pressure to said motor from a source remote from said hub, a valve controlling the application of said fluid to actuate said motor, and electro-magnetic means for actuating said valve, said means comprising electrical contacts movable with said hub and electrically connected to said electromagnetic means, and means for supplying a source of electrical energy to said movable contacts.

5. A variable pitch propeller mechanism comprising a hub structure and blades movably mounted therein, a double-acting vaned type of fluid motor, mounted on the propeller hub, connected with the blades for changing the pitch of the blades, a conduit for supplying fluid under pressure to said motor from a source remote from said hub, a valve in said hub controlling the application of said fluid to actuate said motor, electromagnetic means for actuating said valve, contact rings on said hub, stationary brushes in constant engagement with said rings and connected to a source of electrical energy, and electrical conduits connecting said rings and electro-magnetic valve actuating means.

6. A variable pitch propeller mechanism comprising a hub structure and blades movably mounted therein, a fluid motor mounted on the propeller hub connected with the blades for changing the pitch of the blades, a conduit for supplying fluid under pressure to said motor from a source remote from said hub, a valve in said hub controlling the application of said fluid to actuate said motor, a governor having movable weights mounted in and rotatable with said hub structure, said weights being responsive to the speed of the propeller hub to actuate said fluid controlling valve, electromagnetic means for actuating the governor weights to actuate the fluid control valve at the will of the operator, said electromagnetic means having electrical connection with a current collecting means mounted on the hub structure and rotatable therewith, and means for supplying a source of electrical energy to said current collecting means.

7. In combination with a controllable pitch propeller having a range of pitch adjustment between fixed limit stops, hydraulic means for changing the pitch of said propeller, a valve rotatable with the propeller controlling said hydraulic means, a governor responsive to the speed of the propeller for actuating said valve in one direction, a spring for actuating said valve in opposition to said governor, and manually controlled means rotatable with said propeller, said valve having a neutral position in which said valve is under the control of said governor and said spring, said manually controlled means acting upon said value to positively move said valve to a fixed pitch setting position against the action of said governor and said spring.

8. In combination with a controllable pitch propeller having a range of pitch adjustment between fixed limit stops, hydraulic means for changing the pitch of said propeller, a valve rotatable with the propeller controlling said hydraulic means, a governor responsive to the speed of the propeller for actuating said valve in one direction, a spring for actuating said valve in opposition to said governor, and electromagnetic means rotatable with the propeller operable to hold said valve in a fixed position of its pitch setting movement independently of the action of said governor and said spring.

9. In combination with a controllable pitch propeller having a range of pitch adjustment between fixed limit stops, hydraulic means for changing the pitch of said propeller, a valve rotatable with the propeller controlling said hydraulic means, a governor responsive to the speed of the propeller for actuating said valve in one direction, a spring for actuating said valve in opposition to said governor, and electromagnetic means rotatable with the propeller operable to actuate the governor arms and control valve independently of the speed of the motor.

10. In combination, a controllable pitch propeller having a positive high pitch setting and a positive low pitch setting, actuating means for adjusting the pitch of the propellers intermediate said high and low pitch setting, a control valve rotatable with said propeller for said actuating means, governor means responsive to the propeller speed for controlling said valve, spring means biasing the speed responsive elements of the governor means, and electromagnetic means rotatable with said propeller for operating said governor speed responsive elements independently of the propeller speed.

11. In a variable pitch propeller, propeller-blade pitch-changing mechanism comprising a rotary hydraulically-actuated angularly-movable displacement means geared to the blades of said propeller, a spool valve hollow throughout its length and subject to equal fluid pressure at each end located in said propeller with the axis of said valve disposed transversely to the axis of the propeller, said valve controlling the flow of engine lubricating fluid to and from said mechanism for operating the same, and speed responsive means in said propeller operatively connected with said valve.

12. In combination, a controllable pitch propeller having a positive high pitch setting and a positive low pitch setting, actuating means for adjusting the pitch of the propellers intermediate said high and low pitch setting, a control valve for said actuating means, governor means responsive to the propeller speed for controlling said valve, spring means biasing the speed responsive elements of the governor means, and an electromagnetic force acting upon the metal of the governor fly-weights for operating said governor independently of the propeller speed.

13. In combination with a controllable pitch propeller having a hub structure, a plurality of blades rotatably mounted therein, fluid pressure actuating means for said blades, a valve rotatable with said propeller controlling the flow of fluid to said actuating means, a source of boosted fluid pressure communicating with said valve, a governor for said valve rotatable with the propeller, electromagnetic means for controlling said valve at the will of the operator, and an internal mass rotatable with the propeller developing a force counterbalancing the centrifugal moment of the blades.

WALTER S. HOOVER.